Feb. 23, 1932.     R. H. HAUSSE     1,846,966
ALARM FOR AUTOMOBILES
Filed Dec. 27, 1929
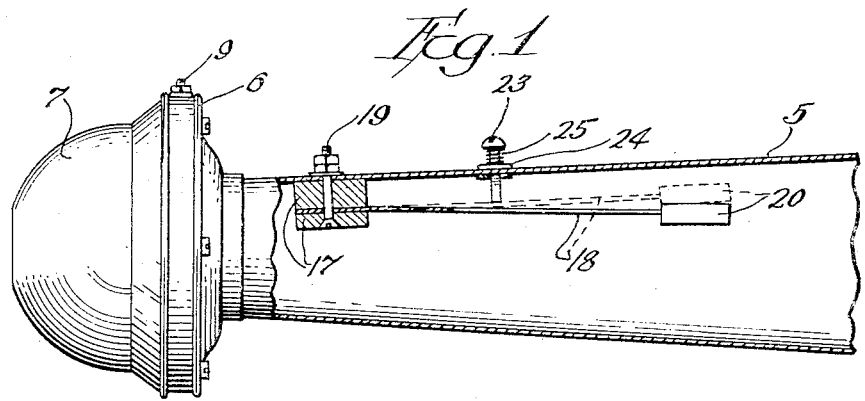
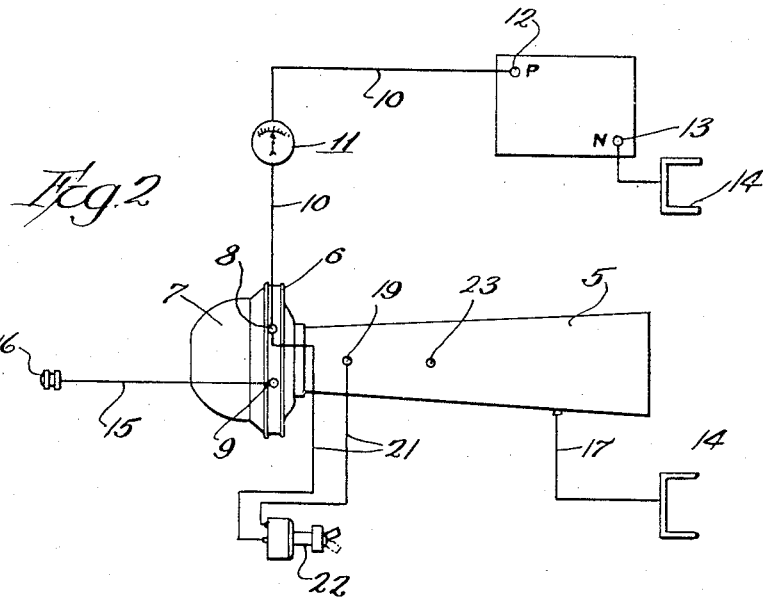
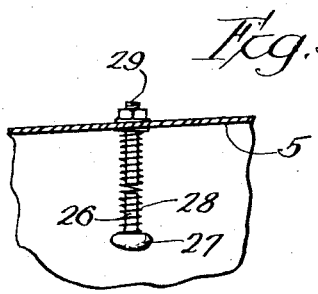
Inventor:
RICHARD H. HAUSSE
By E. K. Lundy
Atty.

Patented Feb. 23, 1932

1,846,966

UNITED STATES PATENT OFFICE

RICHARD H. HAUSSE, OF CHICAGO, ILLINOIS, ASSIGNOR TO TEMME MANUFACTURING CO., OF CHICAGO, ILLINOIS, A CORPORATION OF ILLINOIS

ALARM FOR AUTOMOBILES

Application filed December 27, 1929. Serial No. 416,813.

My present invention relates to an alarm or signal for automobiles, motor vehicles and the like, and has particular reference to an automobile horn that is operated electrically by suitable connections with the electrical system of an automobile and which includes, as an adjunct to the usual electric horn, suitable means whereby a burglar or theft alarm may be sounded. The horn or siren proper may be of any of the specific or well-known types and within the sound-amplifying trumpet or megaphone portion I have mounted a readily yielding element that is adapted, when the alarm switch has been set, to be vibrated by the slightest movement of the vehicle or bodily movement of the horn. Upon the vibration of the spring the electric circuit will be closed through the actuating mechanism of the siren and will cause the latter to be sounded, thus giving the alarm that the vehicle is being tampered with. It is preferred to place the spring pendulum switch device within the megaphone in order that a very compact article will thereby be produced that may be readily handled and sold as a unit so that the user need not have any special structures to attach as the electric horn and the theft alarm will be secured in place at one operation. In addition to the foregoing advantage, it will be seen that this switch device is secreted or hidden from view inside the megaphone where it is difficult to find or be tampered with by unauthorized persons.

In connection with the foregoing structure I interpose a switch in the alarm circuit which is turned on when the occupant leaves the vehicle in order to "set" the alarm and which may be turned off so that the circuit leading from the vibrator is "dead" when the vehicle is in use. The switch is of the miniature type being of relatively small dimensions, and it is to be placed in the vehicle in a secret location which, of course, is well-known and readily accessible to the owner of the vehicle.

I have numerous objects in view, among which may be mentioned the provision of a structure of the character herein disclosed that is simple in construction, novel in the arrangement of its parts, dependable and durable when in use, is made as a unitary portion of the electric horn, and which will not readily get out of order when installed and in use. Further objects and advantages of my present structure will be obvious to others skilled in the art after an understanding of my invention is had from the following detailed description. I prefer to carry out my invention, and to accomplish the objects thereof, in substantially the manner hereinafter fully described and as more particularly pointed out in the claims, reference being herein made to the accompanying drawings that form a part of this specification.

In the drawings:—

Figure 1 is a longitudinal view of an automobile horn in which the amplifying megaphone portion is shown in vertical longitudinal section.

Figure 2 is a top plan of the structure shown in Figure 1 and illustrating the electric circuits.

Figure 3 is a detailed view of a slightly modified structure.

The drawings are to be considered as more or less schematic and are for the purpose of illustrating a typical or preferred form in which my invention may be produced, and in said drawings similar reference characters have been employed to designate like parts wherever they appear throughout the several views.

Referring more particularly to Figs. 1 and 2 the sound amplifying or megaphone portion of the horn is designated by the numeral 5, which at its narrower or smaller end is connected in any suitable manner to the front plate 6 that closes the adjacent portion of a bowl-shaped housing 7. Within the housing there is the usual diaphragm plate such as used in electric horns and the like and the mechanism for creating the sound vibrations is of any suitable and well-known type, the details of which are well-known to persons skilled in the art and need not be described in detail herein. It is sufficient to mention that the actuating mechanism includes means subject to electrical impulses that create vibrations upon the diaphragm plate, so that the vibrations may be amplified by the megaphone.

Two binding posts 8 and 9 are mounted upon the rim of the housing and are connected electrically with the actuating mechanism within said housing, and a conductor 10 leads from post 8 through the ammeter 11 to the positive pole 12 of the battery, the negative pole 13 of said battery being grounded in the usual manner upon a metal portion 14 of the automobile chassis. A conductor 15 leads from binding post 9 to the usual push-button 16 that is conveniently mounted upon the steering wheel in front of the driver's seat in the vehicle. The horn or megaphone itself is connected by a ground wire 17 to the vehicle chassis in the usual manner, and when the circuit is formed through the button 16 the electric mechanism within the housing will be actuated to cause the electric horn to be blown. The above-described structure is typical of an automobile alarm such as at present used on motor-driven vehicles.

Within the megaphone or sound amplifying portion 5, preferably upon the upper or lower segment thereof, I mount a pair of insulating blocks 17 between which an elongated vibratory tongue 18 is secured. A binding post 19 secures the blocks and tongue together and attaches the structure to the metal wall of the megaphone in the manner shown in Fig. 1. The tongue 18 is preferably in the form of a long strip of narrow spring metal and it carries upon its free end a weight 20. Because of its anchorage and the outer weight the tongue is free to vibrate up and down under the slightest impulse and will continue to vibrate for a short period. Thus, in the event the body of the vehicle is moved slightly, either upon its springs or upon its wheels, this movement will cause the tongue to rapidly vibrate until such movement has ceased and for a short period thereafter. I make use of this vibratory action of the tongue to cause a circuit to be shunted into the actuating mechanism of the electric horn within the housing 7.

This is done by means of a conductor 21 leading from the binding post 19 to the binding post 8 upon the housing, while interposed in the circuit in the conductor 21 is a small switch 22. This switch, when the structure is installed in the motor-vehicle, is placed in a convenient but secret location where it will not be found by unauthorized persons but where the owner may readily operate it.

Adjacent the tongue 18, I mount a screw-post 23 in a bushing 24 that is positioned in an aperture in the amplifier or megaphone, and I surround the shank of the screw post with the coil spring 25 which at its opposite ends abuts the head of the screw post and the bushing to prevent vibrations or accidental loosening of the post. This screw post may be moved in and out by rotating it in the proper direction so that the extent of the vibratory movement of the tongue 18 may be adjusted and controlled thereby.

When the occupant of the vehicle leaves the same he turns on the secret switch 22 which will place the parts in position so that each time the tongue 18 vibrates and touches the post 23 the horn will be sounded thus giving an alarm that the vehicle is being tampered with. When the owner is using the vehicle the switch 22 is turned off and the horn may be sounded in the usual manner by pressing the button 16 and the vibration of the tongue 18 against the post will not cause the actuating mechanism within the housing 7 to sound the horn.

In Figure 3 I show a slightly modified construction in which the elongated tongue 18 is omitted in lieu thereof I employ a short rod 26 having a weighted end 27 and hung pendent from the upper segment of the megaphone by the means of a coil spring 28 that is readily extendable and retractable. The upper end of the rod 26 is adapted to come in contact, at the end of each up stroke, with the post 29 and thus form the circuit through the actuating mechanism in the housing 7. This is one form or modification of my structure, and it is obvious that other changes may be made without departing from the principles which I have herein disclosed.

The foregoing description and drawings are given for the purpose of clearness of understanding only and no unnecessary limitations are to be understood therefrom, but the appended claims are to be construed as broadly as permissible in view of the prior art.

What I claim is:—

1. The combination with an electric horn having electro-responsive operating devices and an amplifying megaphone, of an alarm consisting of an elongated spring anchored at one end within said megaphone for yieldable vibratory motion impelled by bodily movement of said horn, terminals on an adjacent portion of the megaphone through which an electrical circuit is formed during motion of said spring, and a conductor leading from one of said terminals to the horn operating devices.

2. The combination with an electric horn having electro-responsive operating devices and an amplifying megaphone, of an alarm consisting of an elongated spring anchored at one end within said megaphone for yieldable vibratory motion impelled by bodily movement of said horn, terminals on an adjacent portion of the megaphone through which an electrical circuit is formed during motion of said spring, a conductor leading from one of said terminals to the horn operating devices, and a shut-off switch interposed in said conductor.

Signed at Chicago, Cook County, Illinois, the 9th day of December, 1929.

RICHARD H. HAUSSE.